US009455519B2

(12) United States Patent
Isenmann et al.

(10) Patent No.: US 9,455,519 B2
(45) Date of Patent: Sep. 27, 2016

(54) POLE MEMBER FOR A PYROTECHNICAL IGNITER OF AN INFLATOR, IGNITER, INFLATOR AND AIRBAG MODULE COMPRISING SAID POLE MEMBER

(71) Applicant: TRW Airbag Systems GmbH, Aschau am Inn (DE)

(72) Inventors: Uta Isenmann, Waldkraiburg (DE); Desiree Koller, Neumarkt St. Veit (DE); Anja Esau, Muhldorf a. Inn (DE)

(73) Assignee: TRW Airbag Sytems GmbH (DE)

( * ) Notice: Subject to any disclaimer, the term of this patent is extended or adjusted under 35 U.S.C. 154(b) by 0 days.

(21) Appl. No.: 14/551,242

(22) Filed: Nov. 24, 2014

(65) Prior Publication Data
US 2015/0171541 A1 Jun. 18, 2015

(30) Foreign Application Priority Data

Dec. 11, 2013 (DE) .................. 10 2013 020 526

(51) Int. Cl.
*H01R 13/405* (2006.01)
*B60R 21/264* (2006.01)
*H01R 13/52* (2006.01)
*B60R 21/26* (2011.01)

(52) U.S. Cl.
CPC ........... *H01R 13/405* (2013.01); *B60R 21/264* (2013.01); *H01R 13/5202* (2013.01); *B60R 2021/26029* (2013.01)

(58) Field of Classification Search
CPC .................. B60R 21/264; B60R 2021/26029; H01R 13/405; H01R 13/5202

USPC ....... 102/202.5, 202.7, 202.8, 202.9, 202.11, 102/202.12, 275.11, 367, 370, 530, 531; 89/1.14; 280/728.1, 741

See application file for complete search history.

(56) References Cited

U.S. PATENT DOCUMENTS

| 4,734,265 | A | * | 3/1988 | Nilsson et al. | ............... 422/165 |
| 5,596,163 | A | * | 1/1997 | Caflisch et al. | ........... 102/202.2 |
| 5,645,298 | A | * | 7/1997 | Stevens et al. | ............... 280/741 |
| 5,690,357 | A | | 11/1997 | Cuevas | |
| 6,053,531 | A | * | 4/2000 | Katsuda et al. | ............... 280/741 |
| 6,073,963 | A | * | 6/2000 | Hamilton et al. | ............ 280/741 |
| 6,936,303 | B1 | | 8/2005 | Katsuda et al. | |
| 7,614,875 | B2 | * | 11/2009 | Katsuda et al. | ............... 431/253 |
| 2002/0162476 | A1 | * | 11/2002 | Parker et al. | .................. 102/530 |

(Continued)

FOREIGN PATENT DOCUMENTS

DE  202004011348  1/2005
DE  102005017868  10/2006

(Continued)

*Primary Examiner* — Bret Hayes
(74) *Attorney, Agent, or Firm* — Tarolli, Sundheim, Covell & Tummino LLP

(57) ABSTRACT

The invention relates to a pole member (11) as prefabricated subassembly for a pyrotechnical igniter (10), especially for an inflator comprising two electrically conductive contact pins (14) embedded in an injection-molded part (13), wherein a fixing member (20) for anchoring the pole member (11) in the inflator is embedded in the injection-molded part (13), wherein the contact pins (14) extend through a through-hole (21) of the fixing member (20) and wherein one or more sealing components (32) are formed or arranged in or on the fixing member (20). Furthermore, the invention relates to an igniter, an inflator and an airbag module comprising such pole member.

24 Claims, 6 Drawing Sheets

(56) References Cited

U.S. PATENT DOCUMENTS

| | | | |
|---|---|---|---|
| 2004/0226472 A1* | 11/2004 | Oda | B60R 21/2644 102/205 |
| 2004/0251667 A1* | 12/2004 | Harada | F42B 3/107 280/736 |
| 2005/0006887 A1* | 1/2005 | Barker et al. | 280/741 |
| 2005/0127649 A1* | 6/2005 | Smith | 280/741 |
| 2011/0101651 A1* | 5/2011 | Bierwirth et al. | B60R 21/2644 280/728.2 |
| 2013/0276664 A1* | 10/2013 | Ohsugi et al. | 102/530 |
| 2013/0305948 A1* | 11/2013 | Hinkofer et al. | F42B 3/12 102/202.7 |
| 2015/0217717 A1* | 8/2015 | Ohsugi | B60R 21/2644 102/530 |
| 2016/0052486 A1* | 2/2016 | Ohsugi | B60R 21/26 102/530 |
| 2016/0121841 A1* | 5/2016 | Katsuta | B60R 21/2644 102/530 |

FOREIGN PATENT DOCUMENTS

| | | | |
|---|---|---|---|
| DE | 102005047768 | 3/2007 | |
| DE | 102012010608 | 11/2013 | |
| EP | 1209436 | 5/2002 | |
| EP | 1460371 | 9/2004 | |
| EP | 1477764 | 11/2004 | |
| WO | 2007/003802 | 1/2007 | |
| WO | WO 2010037516 A2 * | 4/2010 | B60R 21/264 |

\* cited by examiner

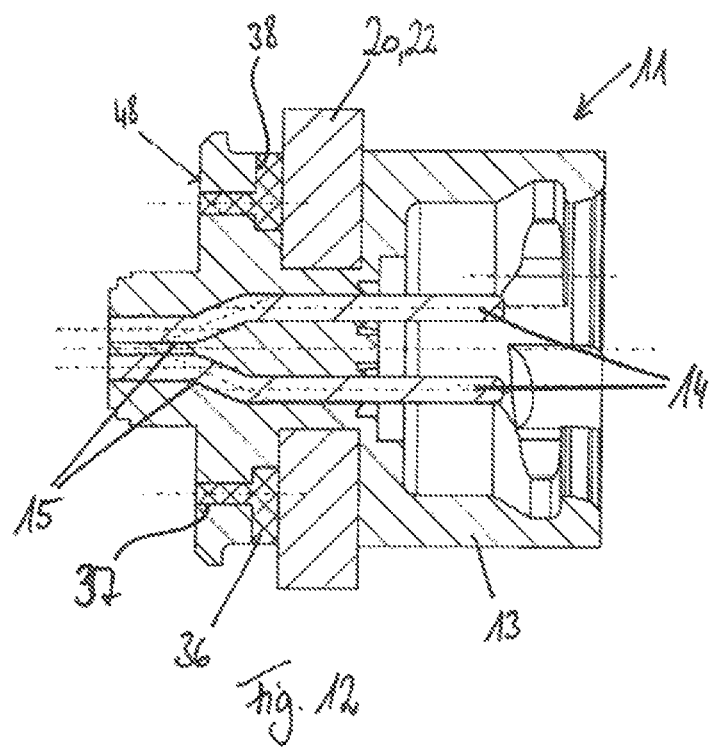

POLE MEMBER FOR A PYROTECHNICAL IGNITER OF AN INFLATOR, IGNITER, INFLATOR AND AIRBAG MODULE COMPRISING SAID POLE MEMBER

BACKGROUND OF THE INVENTION

The invention relates to a pole member for a pyrotechnical igniter, especially for an inflator in accordance with the preamble of claim 1. Furthermore, the invention relates to an igniter, an inflator and an airbag module comprising such pole member. A pole member of the type mentioned in the beginning is known, for example, from WO 2007/003802 A2.

In connection with inflators, a subassembly of a pyrotechnical igniter is referred to as pole member. The pole member comprises two electrically conductive contact pins which are embedded in an injection-molded part. The contact pins protrude at least on one side from the injection-molded part and in this way constitute a plug-in contact for connection to a trigger control.

WO 2007/003802 A2 demonstrates such pole member as part of a pyrotechnical igniter. Apart from the pole member, the pyrotechnical igniter comprises a bridge wire which electrically interconnects the two contact pins. The bridge wire extends across pyrotechnical ignition material which is enclosed by a cap. The cap seals off with the pole member, wherein the pyrotechnical ignition material is arranged in a free space between the cap and the pole member.

Igniters of this type are usually employed in inflators and therefore are connected to a casing of the inflator.

When connecting prefabricated igniters, as for example the igniter according to WO 2007/003802 A2, to a casing of an inflator, basically care has to be taken that humidity is prevented from penetrating the inflator. Therefore, especially high requirements of tightness are made to the connection between the igniter and the inflator casing. These requirements are usually met by additional sealing elements so that known igniters include a relatively large number of components. This entails high production costs, in particular also due to the additionally required processing steps during assembly of the known igniter or pole member. In addition, concerning the sealing elements usually in the form of O-rings high requirements are made to the manufacturing tolerances, thereby the manufacturing expenditure being further increased.

SUMMARY OF THE INVENTION

It is the object of the present invention to describe a pole member for a pyrotechnical igniter of an inflator that includes a simple structural design and during assembly in a casing of an inflator ensures good sealing. Furthermore, it is the object of the invention to state an igniter, an inflator and an airbag module comprising such pole member.

In accordance with the invention, this object is achieved with respect to the pole member by the subject matter of claim 1, with respect to the igniter by the subject matter of claim 9, with respect to the inflator by the subject matter of claim 11 and with respect to the airbag module by the subject matter of claim 13.

In this way the invention is based on the idea to state a pole member as prefabricated subassembly for a pyrotechnical igniter of an inflator comprising two electrically conductive contact pins embedded in an injection-molded part. Furthermore, a fixing member for anchoring the pole member in the inflator is embedded in the injection-molded part. The contact pins extend through a through-hole of the fixing member. According to the invention, in or on the fixing member one or more sealing components are formed or arranged.

In accordance with the present application, a pole member is understood to be a single subassembly of a pyrotechnical igniter, wherein all component parts are fixedly connected. Especially the component parts can be tightly interconnected by surrounding them by injection-molding with the injection-molded part, the latter being formed by said injection-molding. The subassembly and the pole member, resp., cannot be disintegrated without being destroyed. Concretely speaking, the pole member may consist of two electrically conductive contact pins, the fixing member, the injection-molded part and one or more sealing components.

The sealing components can be formed especially directly at the pole member. In this way, additional sealing elements for an igniter of the inflator are avoided. The pole member according to the invention therefore has an especially simple structure so that the manufacturing costs for the pole member are low. As the sealing component is formed directly on or in the fixing member, safe sealing of the inner space of the inflator against an outer space of the inflator is achieved in the case of a completely mounted inflator without an exact positioning of a separate sealing element having to be observed.

In a preferred embodiment of the pole member according to the invention the injection-molded part includes or consists of plastic material, especially polyphenylene sulfide (PPS), polyphthalamide (PPA) which may include fiber reinforcements, and/or a plastic material cross-linked by irradiation. The contact pins and the fixing member hence can be embedded in a plastic material or can be surrounded by injection-molded plastic material forming the injection-molded part. The injection-molded part may significantly shape the outer form or contour of the pole member.

The fixing member preferably includes or consists of a metal. The fixing member serves for tightly connecting the pole member to a casing of an inflator. In order to be capable of adequately absorbing the forces occurring during ignition of a pyrotechnic charge, a tight and stable connection between the pole member and the casing of the inflator is expedient. The use of a metal as material for the fixing member ensures that the pole member is appropriately held in the casing of the inflator. Especially very stable joining techniques between the fixing member and the casing of the inflator can be employed, for example welded and/or crimped joints.

In a further preferred embodiment of the pole member according to the invention the fixing member has a larger sectional diameter than the injection-molded part. In this way, on the one hand the pole member is enabled to be positively fixed in a casing of an inflator. The fixing member can be enclosed, for example, by crimping the casing of the inflator. Moreover, by the different sectional diameters between the injection-molded part and the fixing member a distance satisfying a heat-insulating function is obtained between the injection-molded part and the casing of the inflator in the mounted state. The injection-molded part is especially prevented from deforming due to the heating of the inflator casing.

In general, different sealing components can be used to seal the pole member in the mounted state against a casing of an inflator. The sealing components generally serve for inhibiting a leakage path between the plastic parts and the metal parts of the inflator. In particular, it is to be achieved with the aid of the sealing component that the connection between the injection-molded part and the fixing member is sealed off, i.e. a leakage path from the interior of the inflator to the outside is inhibited.

Basically one or more sealing components may be provided. At least one of the sealing components may be formed on the fixing member as additional sealing element, especially as sealing film, shrink hose and/or viscous sealing material. The additional sealing element can be tightly connected to the fixing member. Concretely speaking, the additional sealing element can be connected to the fixing member by gluing and/or vulcanizing. In a preferred variant, the sealing element includes an O-ring arranged in a clamping groove of the fixing member. The O-ring is preferably fixed by clamping in the clamping groove so that the O-ring is prevented from inadvertently detaching.

As an alternative or in addition, at least one sealing component can be formed in the fixing member by a geometrical design of the fixing member. Especially the sealing component can be formed by at least one recess, at least one undercut and/or at least one groove in the fixing member. In other words, the sealing component can be formed by the fixing member itself which is appropriately shaped for this purpose and especially exhibits a structuring. The formation of at least one sealing component in the fixing member itself facilitates the manufacture of the pole member and reduces the number of components.

The fixing member can preferably be in the form of a disk or a ring. In this way the fixing member can have a circular shape at an outer periphery. This facilitates the connection of the fixing member to a circular inflator casing, for example an inflator pipe.

Preferably the sealing component is formed or arranged in or on at least one end face of the fixing member. The end faces of the fixing member are easily accessible and thus enable simple arrangement of the sealing component. Furthermore, the end faces of the fixing member offer a sufficient surface for a geometrical design of the fixing member to be especially facilitated in the region of the end faces.

Moreover, the sealing component may extend through the through-hole of the fixing member. In this way, sealing between the injection-molded part and the fixing member is further improved.

The pole member according to the invention preferably forms a subassembly of an igniter for an inflator. Such igniter is disclosed and claimed within the scope of an independent aspect of the present application. Concretely speaking, an igniter for an inflator including an afore-described pole member is disclosed and claimed.

In a preferred embodiment of the igniter according to the invention, the contact pins are connected at an axial end of the pole member by a bridge wire. The bridge wire can extend across and/or adjacent to a pyrotechnical ignition material. Preferably the pyrotechnical ignition material is enclosed by a cap which is tightly connected to the axial end of the pole member. Generally the igniter may consist of the pole member and a further subassembly, especially an ignition member. The pole member is formed by the contact pins, the injection-molded part and the fixing member as well as the sealing component. The ignition member, on the other hand, comprises the cap, the ignition material and the bridge wire.

Another independent aspect of the invention relates to an inflator comprising an afore-described pole member and/or igniter. In the inflator according to the invention the fixing member for anchoring the pole member and/or igniter in the inflator may be especially provided to be connected to a casing of the inflator by substance-to-substance bond and/or form closure. The substance-to-substance connection is preferably made by welding. The form-fit connection can be made especially by crimping and/or roller-burnishing.

In a preferred variant of the inflator according to the invention the fixing member constitutes a spacer so that the injection-molded part is arranged to be spaced apart from the casing of the inflator. In this way unfavorable temperature-dependant deformations of the injection-molded part made of plastic material during triggering the inflator, for example, or during other undesired increases in temperature of the inflator casing are avoided.

Finally, within the scope of the present application, an airbag module comprising an afore-described inflator and/or igniter and/or pole member is disclosed and claimed. In general, the airbag module may additionally include an airbag coupled to the inflator so that triggering the inflator results in inflation of the airbag.

BRIEF DESCRIPTION OF THE DRAWINGS

Hereinafter the invention will be illustrated in detail by way of embodiments with reference to the enclosed schematic figures, in which

FIG. 12 shows a cross-sectional view of a pole member according to the invention in accordance with a further preferred embodiment, wherein the sealing component is a viscous sealing material.

DESCRIPTION OF EMBODIMENTS

Figure 1A:
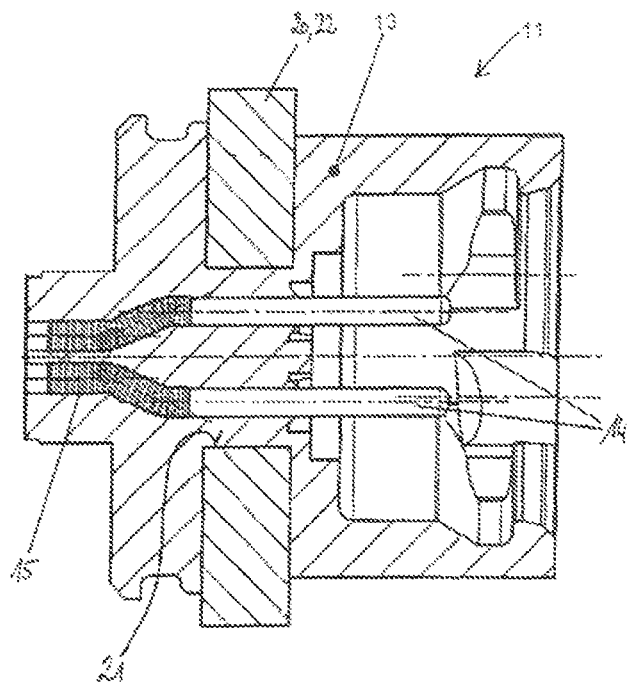
FIG. 1a shows a longitudinal sectional view across a pole member according to the invention formed to include a fixing member.

FIG. 1a illustrates the general design of a pole member 11 according to the invention as a subassembly separate per se for an igniter according to the invention. The pole member 11 comprises two contact pins 14 extending through a through-hole 21 of a fixing member 20. The fixing member 20 can be a disk 22 which in the center exhibits the central through-hole 21. The fixing member 20 is made of metal. The contact pins 14 include an electrically conductive material, especially a metal. As is evident from FIG. 1a, the contact pins 14 include a corrugation 15.

The contact pins 14 and the fixing member 20 are embedded in an injection-molded part 13. Concretely speaking, the contact pins 14 and the fixing member 20 can be surrounded by plastic injection-molding, thereby the injection-molded part 13 being formed. An adequate and fluid-tight connection is obtained between the contact pins 14 and the injection-molded part 13 by the corrugation 15 at the contact pins 14. At one axial end the injection-molded part 13 forms a socket into which the contact pins 14 protrude. The contact pins 14 can be electrically connected to an ignition control via the socket.

The pole member 11 according to FIG. 1a further includes a sealing component 32 which is not shown for reasons of clarity in FIG. 1a. The sealing component 32 is preferably formed on or in the fixing member 20 and can have various configurations. In the FIGS. 2 to 7 illustrated hereinafter preferred configurations of the fixing member 20 including a sealing component 32 are exemplified.

Figure 1B:
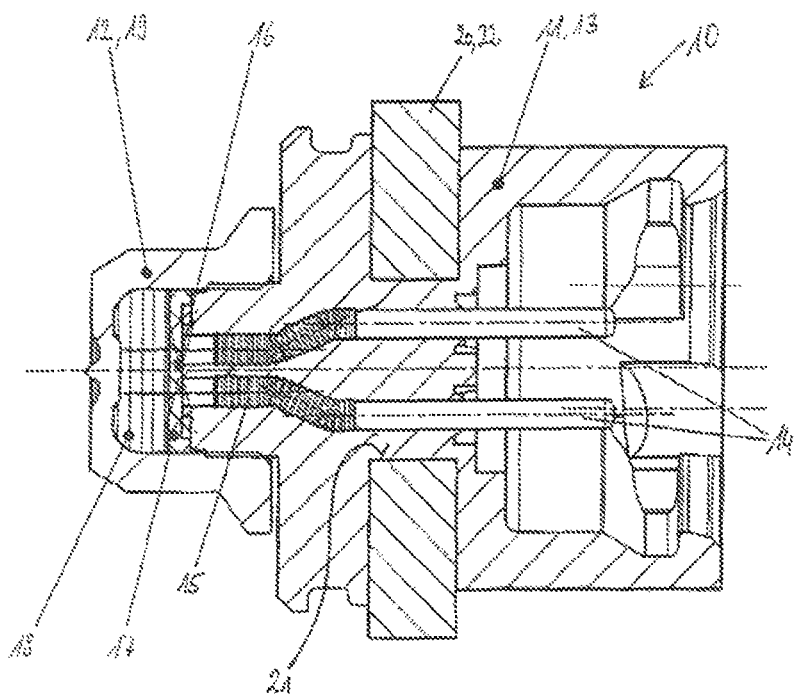
FIG. 1b shows a longitudinal sectional view across an igniter according to the invention including a pole member formed to have a fixing member.

FIG. 1b shows the general design of an igniter 10 according to the invention including the pole member 11 according to the invention as shown in FIG. 1a. The igniter 10 in particular has two separate subassemblies, a first subassembly being formed by the pole member 11 and a second subassembly being formed by an ignition member 12. The pole member 11 may concretely be a prefabricated subassembly, as afore-described, on which then the ignition member 12 is assembled.

The pole member 11 of the igniter 10 of FIG. 1b has the same structure as described further above concerning FIG. 1a. Here additionally the ignition member 12 is mounted on a second axial end of the pole member 11. The ignition member 12 comprises a bridge wire 16 electrically interconnecting and/or bridging the contact pins 14. The bridge wire 16 passes through a first ignition material 17 and, resp., contacts the first ignition material 17 to which it is directly adjacent. Above the first ignition material 17 a second ignition material 18 is arranged directly adjacent thereto. The ignition materials 17, 18 fill a cap 19 which is slipped over the second axial end of the pole member 11 and is tightly connected to the pole member 11 at the second axial end. In contrast to the pole member 11, the ignition member 12 preferably is not prefabricated but is assembled above the pole member 11 during manufacture. For this purpose, first the bridge wire 16 is arranged between the contact pins 14, preferably welded to the end sides thereof, and after that the ignition material 17, 18 is assembled and finally the latter is closed off by the cap 19. In terms of process it is also possible, after arranging and, resp., welding the bridge wire 16, to fill the ignition material 17, 18 into the cap 19, to compress it there and then to connect the cap 19 filled with ignition material 17, 18 in this way to the pole member 11, especially by means of ultrasonic welding.

In this case, too, the pole member 11 of the igniter 10 according to FIG. 1b equally includes a sealing component 32 which is not shown in FIG. 1b for reasons of clarity. As described in the foregoing, the sealing component 32 is preferably formed on or in the fixing member 20 and can have various configurations. In the FIGS. 2 to 7 described hereinafter in detail preferred configurations of the fixing member 20 including a sealing component 32 are exemplified.

Basically different options for sealing the pole member 11 are imaginable. On the one hand, an additional sealing element 33 can be arranged as sealing component 32 on or at the fixing member 20. Those additional sealing elements 32 are, for example, sealing films 47, shrink hoses and/or fluid or viscous sealing materials 36. Possible design variants of the fixing member 20 including an additional sealing element 33 are shown in FIGS. 2, 3, 6 and 7. The additional sealing elements 33 shown there are preferably arranged and, resp., fixed on the fixing member 20 before the injection-molded part 13 is injection-molded around the fixing member 20.

Further, it may be provided to dispose an additional sealing element 33, especially in the form of a viscous sealing material 36, on the fixing member 20 after injection-molding of the injection-molded part 13. Such variant is shown in FIG. 12.

Finally the sealing component 32 may also be formed by a geometrical configuration of the fixing member 20. For example, the fixing member 20 can exhibit undercuts 31 and/or grooves 24. Variants of the fixing member 20 which is geometrically designed so that a sealing component 32 is formed in the fixing member 20 are illustrated in FIGS. 4 and 5.

Figure 2:
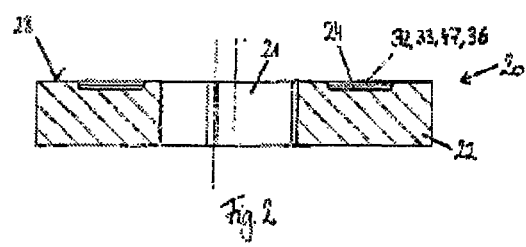
FIG. 2 shows a cross-sectional view of a fixing member of a pole member according to the invention in accordance with a preferred embodiment including a sealing component formed as a groove in the fixing member.

In the embodiment according to FIG. 2, the sealing component 32 is formed as sealing film 47 on the fixing member 20. The fixing member 20 especially consists of a metallic disk 22 having a through-hole 21. Furthermore, the disk 22 comprises an end face 23 in which a groove 24 is arranged. The groove 24 extends in circular shape around the through-hole 21. The groove 24 and the through-hole 21 can be arranged especially concentrically. In the groove 24 the sealing component 32 is arranged. In the embodiment according to FIG. 2, the sealing component 32 is a sealing film 47 glued into the groove 24. Alternatively the groove 24 can also be employed for receiving a viscous sealing material 36.

Figure 3:
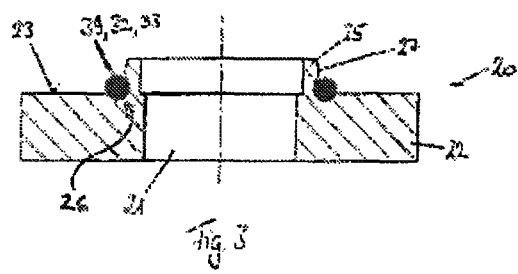
FIG. 3 shows a cross-sectional view of a fixing member of a pole member according to the invention in accordance with a further preferred embodiment, the sealing component being an O-ring.

In the embodiment according to FIG. 3 the fixing member 20 is equally in the form of a disk 22 which additionally includes an annular extension 25. The annular extension 25 has an outer diameter inferior to the outer diameter of the disk 22. Along the outer diameter of the annular extension 25 is formed an arch 27 that is transformed into a clamping groove 26 in the transition region between the annular extension 25 and the disk 22. The clamping groove 26 can especially form a rounded corner of the transition region between the disk 22 and the annular extension 25. In the clamping groove 26 a sealing component 32 is disposed. In the embodiment according to FIG. 3 the sealing component 32 is an O-ring 39 fixed in the clamping groove 26. The arch 27 prevents the O-ring 39 from detaching and sliding off the annular extension 25. Instead of an O-ring 39, also a shrink hose can be used as sealing component 32. Moreover it is evident in FIG. 3 that the fixing member 20 has a through-hole 21, wherein the through-hole 21 has a smaller sectional diameter in the area of the disk 22 than in the area of the annular extension 25.

Figure 4:
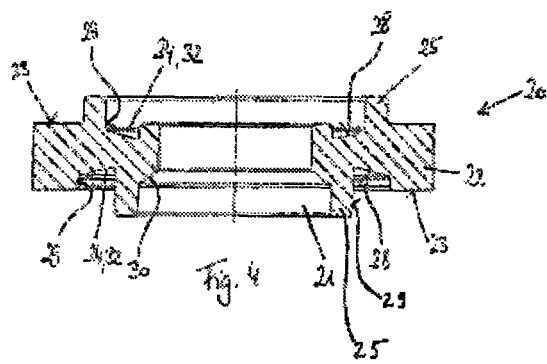
FIG. 4 shows a cross-sectional view of a fixing member of a pole member according to the invention in accordance with a further preferred embodiment, the sealing component being formed by a groove and an annular extension in the fixing member.
Figure 5:
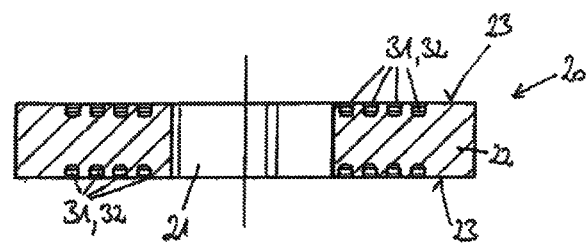
FIG. 5 shows a cross-sectional view of a fixing member of a pole member according to the invention in accordance with a further preferred embodiment, wherein undercuts are formed as sealing component in the fixing member.

FIG. 4 illustrates another preferred variant of a fixing member 20, wherein the fixing member 20 equally takes the shape of a disk 22. Centrally through the disk 22 extends a through-hole 21. Furthermore, the fixing member 20 includes an annular extension 25 on both sides of the disk 22. The sectional diameter of the through-hole 21 is larger in each of the annular extensions 25 than in the disk 22 or in the disk portion of the fixing member 20. Concretely speaking, the through-hole 21 has a conical tapering 30 disposed between the disk 22 and a lower annular extension 25.

In each of the end faces 23 of the disk 22 an annular groove 24 is formed. Each annular groove 24 has a bottom face 28 extending obliguely between two side faces 29. The bottom surface 28 of the grooves 24 is inclined toward the longitudinal axis and/or axis of rotation of the fixing member 20. In other words, the groove 24 is deeper in the area of an inner side face 29 than in the area of an outer side face 29.

In an upper end face 23 the groove 24 is limited by the annular extension 25 on an outer periphery. In other words, a radially outer side face 29 of the groove 24 is transformed, while being aligned, into the annular extension 25 and, resp., the through-hole 21 of the annular extension 25. The groove 24 on the lower side of the disk 22 thus has a radially inner side face 29 which is transformed, while being aligned, into the annular extension 25, especially an outer periphery of the annular extension 25.

The grooves 24 in total form undercuts or material holes at the fixing member 20 so that when the injection-molded part 13 is injection-molded around the fixing member 20 the plastic material of the injection-molded part 13 penetrates the grooves 24. In this way the connection between the injection-molded part 13 and the fixing member 20 is closed in a fluid-tight manner along a thus formed enlarged connecting distance/area.

FIG. 5 illustrates a further variant of the fixing member 20 which is geometrically configured so that in the fixing member 20 a sealing component 32 is formed. The sealing component 32 is formed especially by undercuts 31 provided at the end faces 23 of the fixing member 20. Concretely speaking, the fixing member 20 is a disk 22 including two end faces 23, with a through-hole 21 extending centrally through the disk 22. The end faces 23 include undercuts 31, wherein preferably plural undercuts 32 are arranged on different radii along the end face 23. The undercuts 31 can be annular grooves 24. In the shown embodiment the undercuts 31 are in the form of recesses extending at a distance from each other around the through-hole 21 on the end face 23. The undercuts 31 allow adequate fluid-tight sealing between the fixing member 20 and the injection-molded part 13, as during injection-molding around the fixing member 20 the plastic material of the injection-molded part 13 flows into the undercuts 31. Hence sealing is effectuated substantially by shrinking procedures during injection-molding of the injection-molded part 13.

Figure 6:
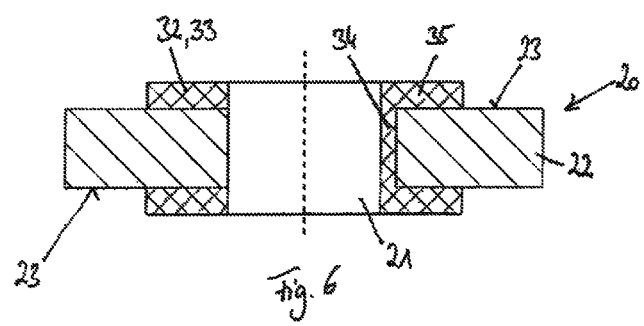
FIG. 6 shows a cross-sectional view of a fixing member of the pole member according to the invention in accordance with a further preferred embodiment, wherein the sealing component is formed as an additional sealing element.
Figure 7:
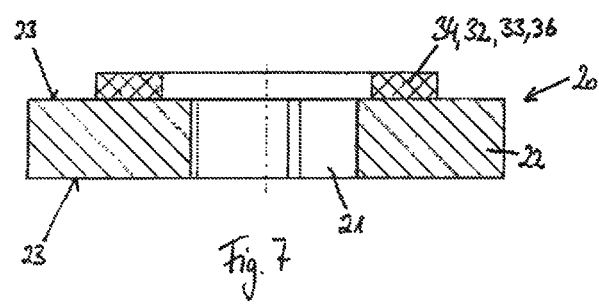
FIG. 7 shows a cross-sectional view of a fixing member of the pole member according to the invention in accordance with a further preferred embodiment, the sealing component being in the form of a sealing ring.

Each of the FIGS. 6 and 7 illustrates an embodiment of a fixing member 20 equipped with an additional sealing element 33 as sealing component 32. The fixing member 20 in both variants is a disk 22 having a central through-hole 21 and two end faces 23. In the embodiment according to FIG. 6 the additional sealing element 33 is formed by a sealing ring 34 extending at least in portions through the through-hole 21 and having two sealing flanges 35 which extend annularly over the end faces 23. The sealing ring 34 according to FIG. 6 thus includes a circular-cylindrical inner contour and at least in portions reaches through the through-hole 21. As shown in the section of FIG. 6, the sealing ring 34 is not adjacent in its axial extension to the full surface of the through-hole 21 but includes at least one axially extending interruption through which plastic material can flow during subsequent injection-molding of the injection-molded part 13. The sealing ring 34 may exhibit several of those interruptions which consequently form ducts for flow of the plastic material during injection-molding so that at these positions the plastic material can directly adhere to the disk 22 in the region of the through-hole 21.

In the embodiment according to FIG. 7 the additional sealing element 33 is equally configured as sealing ring 34, the sealing ring 34 having a disk shape. The sealing ring 34 is arranged on an end face 23 of the disk 22 and includes a sealing ring aperture which is larger than the through-hole 21 of the disk 22. Preferably the sealing ring 34 and the disk 22 are arranged concentrically to each other. In general, the sealing ring 34 can be formed by viscous sealing material 36.

In the embodiment according to FIG. 6, the sealing material 36 is applied to both sides of the disk 22. In the embodiment according to FIG. 7, the sealing material 36 is applied to one side of the disk 22.

Figure 8:
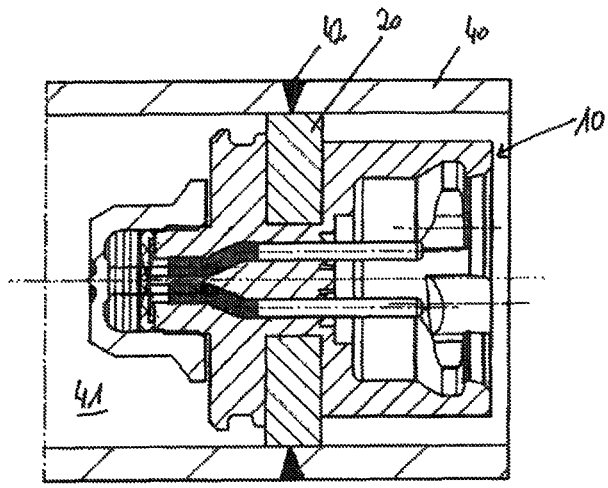
FIG. 8 shows a longitudinal sectional view across an igniter according to the invention in accordance with a preferred embodiment in the mounted state inside a casing of an inflator, wherein the casing is connected to the fixing member by a radial weld.
Figure 9:
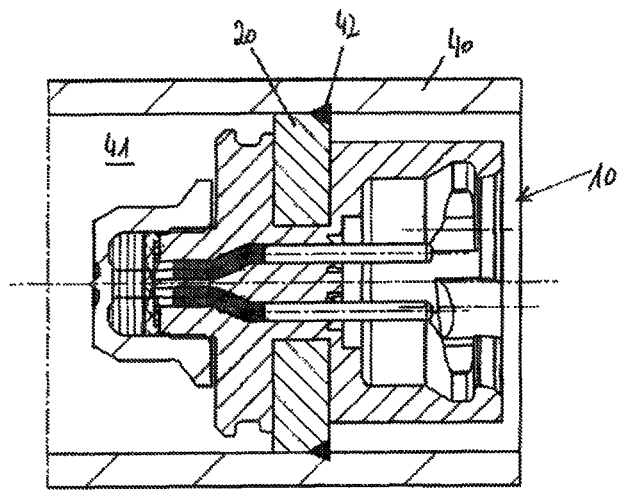
FIG. 9 shows the igniter according to FIG. 8 in the casing of the inflator, the connection between the casing and the fixing member being an axial weld.

The FIGS. 8 to 11 show different variants for connecting the igniter 10 and, resp., the pole member 11 to a casing 40 of an inflator. The casing 40 is preferably tubular and made from a metal. The connection between the igniter 10 and, resp., the pole member 11 and the casing 40 is basically made with the aid of the fixing member 20 equally made from a metal. In this way, the igniter 10 and, resp., the pole member 11 can be incorporated in the inflator e.g. by means of a welded joint between the casing 40 and the fixing member 20. FIGS. 8 and 9 illustrate preferred variants for the welded joint between the fixing member 20 and the casing 40. The fixing member 20 can be fixed to the casing 40 by a radial weld 42, for example (FIG. 8). Alternatively or in addition, an axial weld 42 can be provided to ensure the substance-to-substance connection between the fixing member 20 and the casing 40 (FIG. 9).

Figure 10:
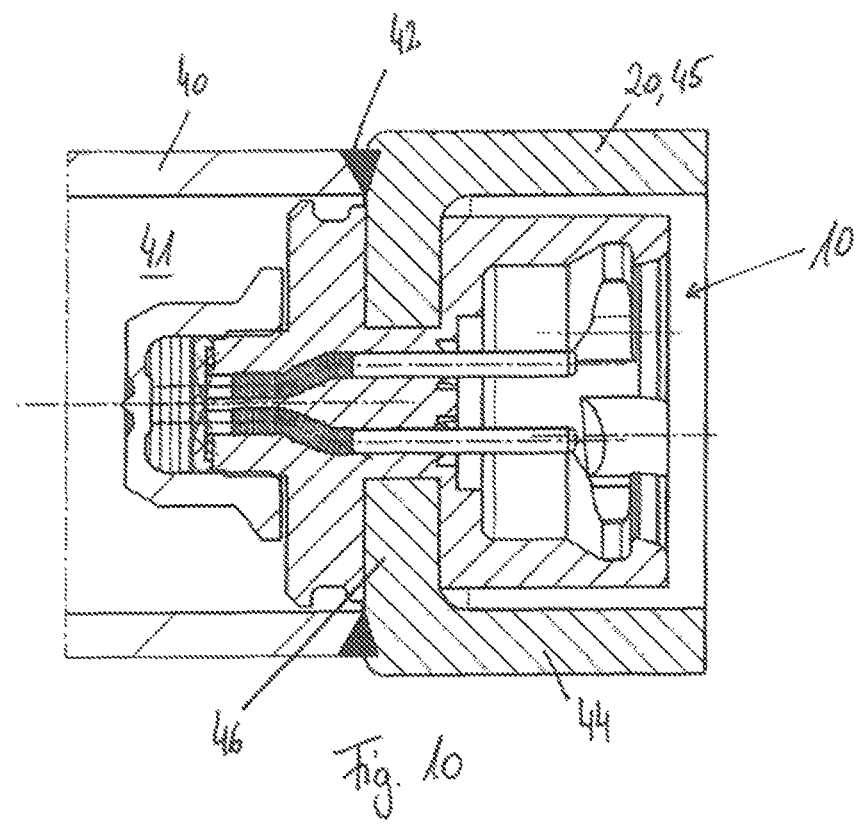
FIG. 10 shows a longitudinal sectional view across an igniter according to the invention inside a casing of an inflator, the connection between the casing and the fixing member being made by a radial weld and the fixing member being formed by a ring having a cylindrical portion.

Another variant for connecting an igniter 10 and, resp., the pole member 11 to a casing 40 of the inflator is shown in FIG. 10. In this case equally a radial weld 42 is used for connecting the fixing member 20 to the casing 40. In contrast to the embodiments according to FIGS. 8 and 9, the fixing member 20 of the pole member 11 according to FIG. 10 is of annular shape or forms a ring 44 with the cylindrical portion 45 and a disk-shaped end flange 46. The casing 40 therefore is not completely slid over the igniter 10 or pole member, but rests on the disk-shaped end flange 46 of the fixing member 20 and is tightly connected to the disk-shaped end flange 46 by a radial weld 42.

Basically the welded joint between the fixing member 20 and the casing 40 can be brought about by radial welding, axial welding or friction welding.

Figure 11:
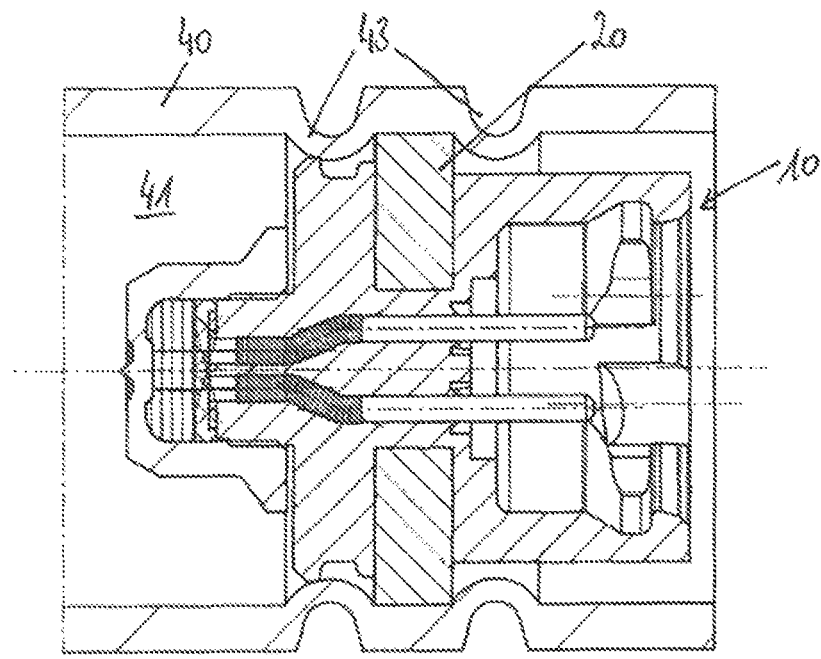
FIG. 11 shows a cross-sectional view across the igniter according to FIG. 8, wherein the connection between the igniter and the casing of the inflator is made by crimping.

FIG. 11 illustrates a variant in which the igniter 10 and, resp., the pole member 11 are connected to the casing 40 by a crimping 43. The housing 40 has a tubular shape, wherein the igniter 10 is arranged completely inside the casing 40. The crimping 43 is formed on both end faces 23 of the fixing member 20 so that the fixing member 20 is positively fixed between the crimping 43 which is especially configured as double crimping.

From FIGS. 8 to 11 the effects of the present invention become clearly visible. The casing 40 contains in a propellant chamber 41 a propellant which is not shown that is to be ignited by triggering the igniter 10. The propellant, preferably in the form of compressed tablets or rings, frequently remains in the casing 40 for several years without the igniter 10 being triggered. Nevertheless, it has to be ensured that triggering the igniter 10 results in an effective and functional ignition of the propellant. Therefore it is necessary to protect the propellant in the propellant chamber 41 from humidity against the outer area of the inflator. Therefore great importance is attributed to the sealing between the igniter 10 and, resp., the pole member 11 and the casing 40. Also humidity paths through the igniter 10 and, resp., the pole member 11 itself have to be taken into account. Especially considerable interfaces are the transitions between different materials, especially between the contact pins 24 and the injection-molded part 13 and/or the fixing member 20 and the injection-molded part 13. The corrugation 15 at the contact pins 14 allows, for example, avoiding a humidity path along the contact pins 14. According to the invention, in the area of the fixing member 20 a sealing component 32 is provided that ensures a humidity path between the fixing member 20 and the injection-molded part 13 being inhibited. Thus the invention improves the tightness of a pole member and consequently also that of an inflator in which the pole member is assembled with low expenditure in terms of construction.

Another alternative option for sealing the pole member 11 is shown in FIG. 12. As sealing component 32 a sealing material 36 is used which is arranged on the fixing member 20 after formation of the injection-molded part 13. Concretely speaking, the pole member 11 shown in FIG. 12 includes a fixing member 20 having a through-hole 21 through which the contact pins 14 including a corrugation 15 extend. The fixing member 20 and the contact pins 14 are embedded in the injection-molded part 13, wherein during manufacture first the fixing member 20 is positioned, subsequently the contact pins 14 are aligned relative to the fixing member 20 and finally the fixing member 20 and the contact pins 14 are surrounded by plastic injection-molding so as to form the injection-molded part 13. In the injection-molded part 13 a filling orifice 37 and an annular gap 38 are formed. The annular gap 38 extends annularly around the injection-molded part 13 and is arranged above the fixing member 20. The annular gap 38 is preferably open toward the outer periphery of the injection-molded part 13. Perpendicularly to the annular gap 38, two or more filling orifices 37 are provided which are opened to an annular surface 48 of the injection-molded part 13. After formation of the injection-molded part 13 a viscous sealing material 36 is introduced, preferably pressed into the annular gap 38 via the filling orifices 37. The sealing material 36 completely fills the annular gap 38 and is arranged directly on the fixing member 20, especially on the end face 23 of the fixing member 20. The fixing member 20 is in the form of a disk 22.

LIST OF REFERENCE NUMERALS 10 igniter
11 pole member
12 ignition member
13 injection-molded part
14 contact pin
15 corrugation
16 bridge wire
17 first ignition material
18 second ignition material
19 cap
20 fixing member
21 through-hole
22 disk
23 end face
24 groove
25 annular extension
26 clamping groove
27 arch
28 bottom face
29 side face
30 conical tapering
31 undercut
32 sealing component
33 sealing element
34 sealing ring
35 sealing flange
36 sealing material
37 filling orifice
38 annular gap
39 O-ring
40 casing
41 propellant chamber
42 weld
43 crimping
44 ring
45 cylindrical portion
46 disk-shaped end flange
47 sealing film
48 annular face

The invention claimed is:

1. A prefabricated pole member subassembly for a pyrotechnical igniter of an inflator, the pole member comprising:
   an injection-molded part having a first end for receiving an ignition member and a second end opposite the first end;
   a fixing member embedded in the injection molded part for anchoring the pole member subassembly in the inflator, and
   contact pins embedded in the injection-molded part, the contact pins having first end portions exposed at the first end of the injection-molded part, and second end portions exposed at the second end portion of the injection-molded part.

2. The pole member (11) according to claim 1, wherein the injection-molded part (13) includes a plastic material.

3. The pole member according to claim 2, wherein the plastic material includes at least one of polyphenylene sulfide (PPS), polyphthalamide (PPA), and a plastic material cross-linked by irradiation.

4. The pole member (11) according to claim 1, wherein the fixing member (20) includes a metal.

5. An igniter (10) comprising the pole member (11) according to claim 1.

6. The igniter (10) according to claim 5, wherein the contact pins (14) are connected at the first end of the injection-molded part by a bridge wire (16) which extends through at least one of and adjacent to a pyrotechnical ignition material (17, 18), wherein the pyrotechnical ignition material (17, 18) is enclosed by a cap (19) which is connected to the first end of the injection-molded part.

7. An inflator comprising the igniter (10) according to claim 5.

8. The inflator according to claim 7, wherein the fixing member (20) for anchoring the pole member (11) and/or the igniter (10) in the inflator is connected to a casing (40) of the inflator by substance-to-substance bond.

9. The inflator according to claim 8, wherein the substance-to-substance bond is at least one of welding, form closure, and crimping.

10. The inflator according to claim 8, wherein the fixing member forms a spacer so that the injection molded part is arranged to be spaced apart from the casing of the inflator.

11. An airbag module comprising the inflator according to claim 7.

12. The pole member according to claim 1, wherein the contact pins include a corrugation that forms a fluid-tight connection between the contact pins and the injection-molded part.

13. The pole member according to claim 1, wherein the fixing member has a larger sectional diameter than the injection molded part.

14. The pole member according to claim 1, wherein the fixing member is in the form of a disk or a ring.

15. The pole member according to claim 1 further comprising one or more sealing components formed or arranged in or on the fixing member.

16. The pole member (11) according to claim 15, wherein the at least one sealing component (32) is formed on the fixing member (20) as an additional sealing element (33).

17. The pole member (11) according to claim 16, wherein the additional sealing element (33) is connected to the fixing member (20) by at least one of gluing and vulcanizing.

18. The pole member (11) according to claim 16 wherein the additional sealing element (33) includes an O-ring (39) which is disposed in a clamping groove (26) of the fixing member (20).

19. The pole member according to claim 16, wherein the additional sealing element is at least one of sealing film, shrink hose, fluid sealing material, and viscous sealing material.

20. The pole member (11) according to claim 15, wherein the at least one sealing component (32) is formed in the fixing member (20) by a geometric design of the fixing member (20).

21. The pole member according to claim 20, wherein the geometric design is at least one of a recess, an undercut, and a groove.

22. The pole member according to claim 15, wherein the fixing member includes a through-hole through which the contact pins extend.

23. The pole member (11) according to claim 22, wherein the at least one sealing component (32) is formed or arranged in or on at least one end face (23) of the fixing member (20) and extends through the through-hole (21) of the fixing member (20).

24. A pyrotechnical igniter for an inflator, the igniter comprising:
an injection-molded part having first and second opposite end portions,
a fixing member embedded in the injection molded part and being configured to be anchored to the inflator,
contact pins embedded in the injection-molded part, and
an ignition member secured to the first end of the injection-molded part, wherein the first end of the injection-molded part is configured so that the ignition member is fit over a radially outward facing surface of the first end of the injection-molded part.

* * * * *